(12) United States Patent
Hsieh

(10) Patent No.: US 9,095,966 B2
(45) Date of Patent: Aug. 4, 2015

(54) TORQUE TIRE ARBOR

(71) Applicant: Wei-Ning Hsieh, Taichung (TW)

(72) Inventor: Wei-Ning Hsieh, Taichung (TW)

( * ) Notice: Subject to any disclaimer, the term of this patent is extended or adjusted under 35 U.S.C. 154(b) by 26 days.

(21) Appl. No.: 14/144,507

(22) Filed: Dec. 30, 2013

(65) Prior Publication Data

US 2015/0183098 A1    Jul. 2, 2015

(51) Int. Cl.
*B25B 23/14* (2006.01)
*B25B 23/142* (2006.01)
*B60C 23/04* (2006.01)
*G01M 17/02* (2006.01)

(52) U.S. Cl.
CPC .......... *B25B 23/1425* (2013.01); *B60C 23/0486* (2013.01); *G01M 17/02* (2013.01)

(58) Field of Classification Search
CPC .. B25B 23/14; B25B 23/1425; B25B 23/1427
USPC .............................. 73/146.8, 862.21
See application file for complete search history.

(56) References Cited

U.S. PATENT DOCUMENTS 7,721,592 B2 * 5/2010 Bucknell ...................... 73/146.8
2011/0094316 A1 * 4/2011 Hsieh ........................ 73/862.321

* cited by examiner

*Primary Examiner* — Lisa Caputo
*Assistant Examiner* — Nathaniel T Woodward

(57) ABSTRACT

A torque tire arbor contains a body, and the body includes a driving post and a digital seat. The digital seat covers and connects with the driving post, the driving post has a connecting segment defined on a first end thereof so as to couple with a wrench and has a working segment formed on a second end thereof so as to join with a socket. The body also includes a torque sensing unit for sensing a torque value and a pressure sensing unit for detecting a tire pressure value, the digital seat includes a display unit electrically connected with the torque sensing unit and the pressure sensing unit so as to display the torque value and the tire pressure value.

4 Claims, 5 Drawing Sheets

TORQUE TIRE ARBOR

FIELD OF THE INVENTION

The present invention relates to a torque tire arbor which not only can sense torque pound of locking a tire but also can measure the tire pressure value of the tire after replacing the tire.

BACKGROUND OF THE INVENTION

A conventional digital torque wrench is disclosed in TW Patent No. I376294 and contains a body formed in a hollow tube shape; a driving head including a head end and a strain section extending to the head end and disposed in the body; at least one strain sensor mounted on the strain section; a torque setting device fixed on the body and arranged to input a preset torque; a comparator secured on the body and coupling with the strain sensor and the torque setting device; and an electromagnetic force releasing component including an adjustable moving rod formed on the body and corresponding to the driving head, wherein the electromagnetic force releasing component is electrically connected with the comparator; and the moving rod extends outwardly or retracts backwardly to interfere the driving head, thus limiting the driving head.

However, when replacing a tire, the digital torque wrench cannot measure a tire pressure value of a tire after replacing the tire.

The present invention has arisen to mitigate and/or obviate the afore-described disadvantages.

SUMMARY OF THE INVENTION

The primary object of the present invention is to provide a torque tire arbor which not only can sense torque pound of locking a tire but also can measure the tire pressure value of the tire after replacing the tire To obtain the above objective, a torque tire arbor provided by the present invention contains: a body, and the body includes a driving post and a digital seat.

The digital seat covers and connects with the driving post, the driving post has a connecting segment defined on a first end thereof so as to couple with a wrench and has a working segment formed on a second end thereof so as to join with a socket.

The body also includes a torque sensing unit for sensing a torque value and a pressure sensing unit for detecting a tire pressure value, the digital seat includes a display unit electrically connected with the torque sensing unit and the pressure sensing unit so as to display the torque value and the tire pressure value.

DETAILED DESCRIPTION OF THE PREFERRED EMBODIMENTS

Figure 1:
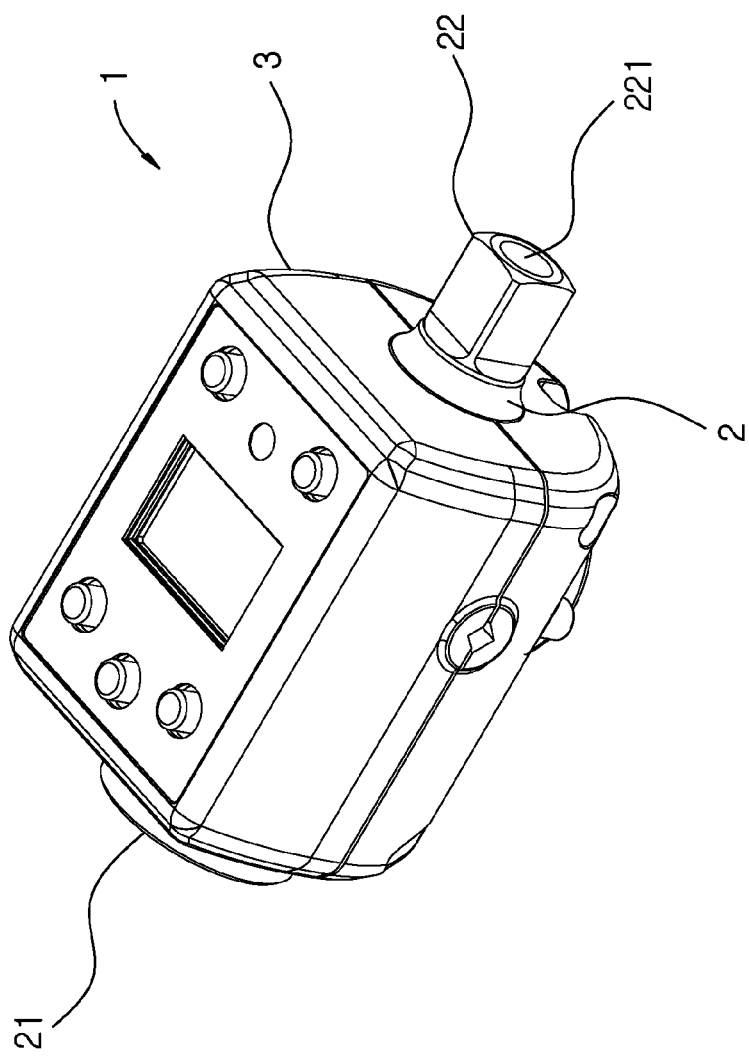
FIG. 1 is a perspective view showing the assembly of a torque tire arbor according to a first embodiment of the present invention.
Figure 2:
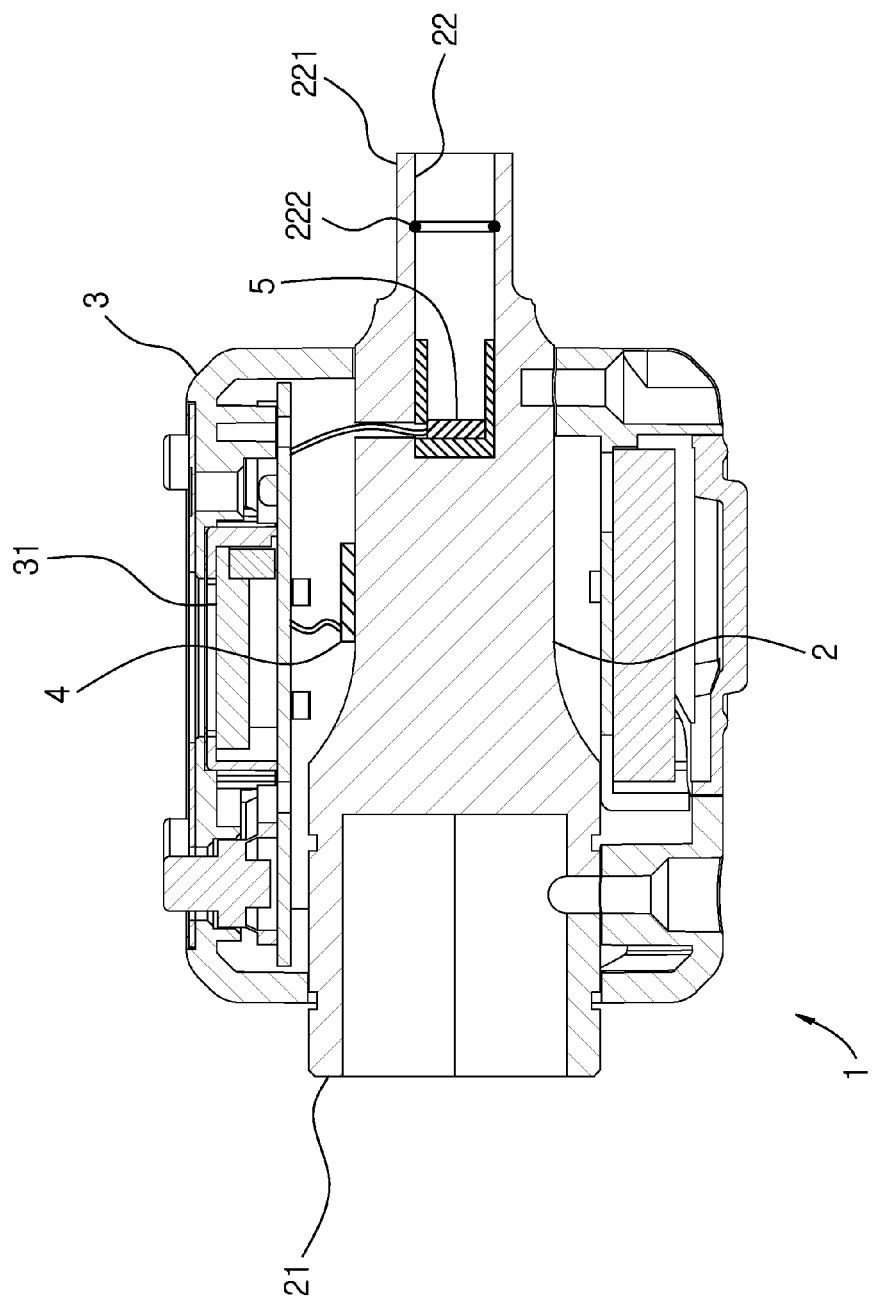
FIG. 2 is a cross sectional view showing the assembly of torque tire arbor according to the first embodiment of the present invention.
Figure 3:
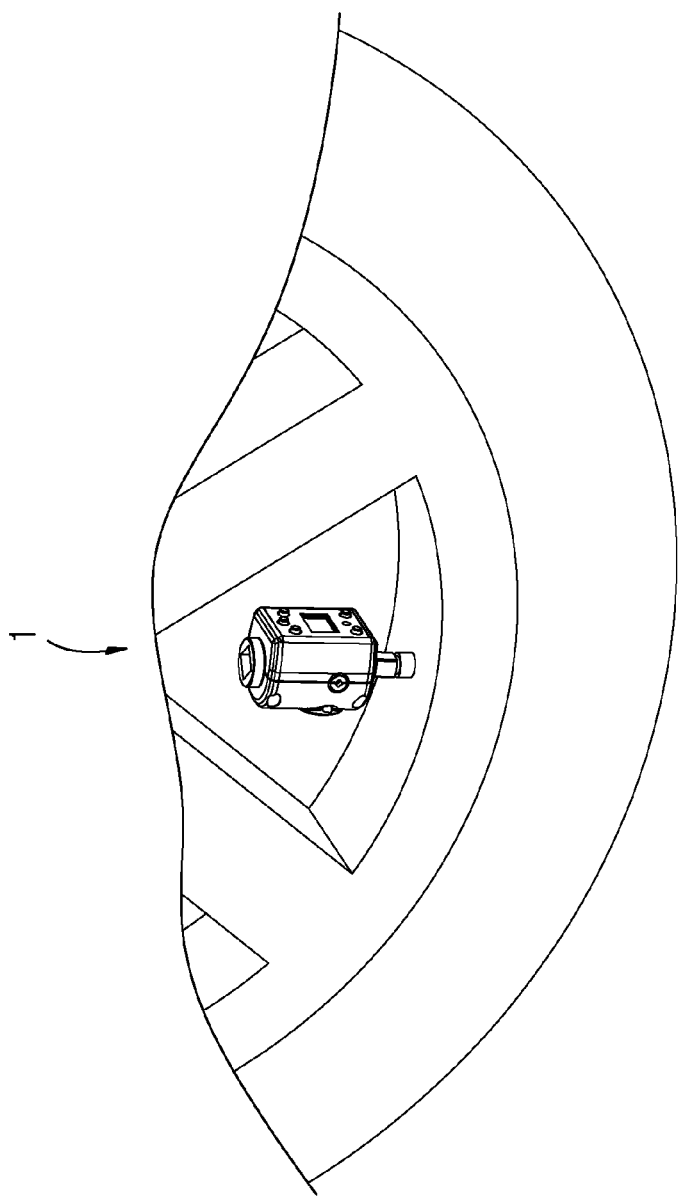
FIG. 3 is a perspective view showing the application of the torque tire arbor according to the first embodiment of the present invention.

With reference to FIGS. 1-3, a torque tire arbor according to a first embodiment of the present invention comprises a body 1, and the body 1 includes a driving post 2 and a digital seat 3.

The digital seat 3 covers and connects with the driving post 2, the driving post 2 has a connecting segment 21 defined on a first end thereof so as to couple with a wrench and a working segment 22 formed on a second end thereof so as to join with a socket. The body 1 also includes a torque sensing unit 4 for sensing a torque value and a pressure sensing unit 5 for detecting a tire pressure value. The digital seat 3 includes a display unit 31 electrically connected with the torque sensing unit and the pressure sensing unit so as to display the torque value and the tire pressure value.

The working segment 22 has a receiving groove 221 defined therein, and the pressure sensing unit 5 is mounted in the receiving groove 221, and the receiving groove 221 has an airtight rubber ring 222 fitted around an inner wall thereof proximate to an opening of the receiving groove 221.

Thereby, in tire replacement operation, the torque tire arbor not only can sense torque pound of locking a tire but also can measure the tire pressure value of the tire after replacing the tire (as shown in FIG. 3).

Furthermore, the torque sensing unit 4 is a torque strain gauge attached on an outer surface of the driving post 2.

Figure 4:
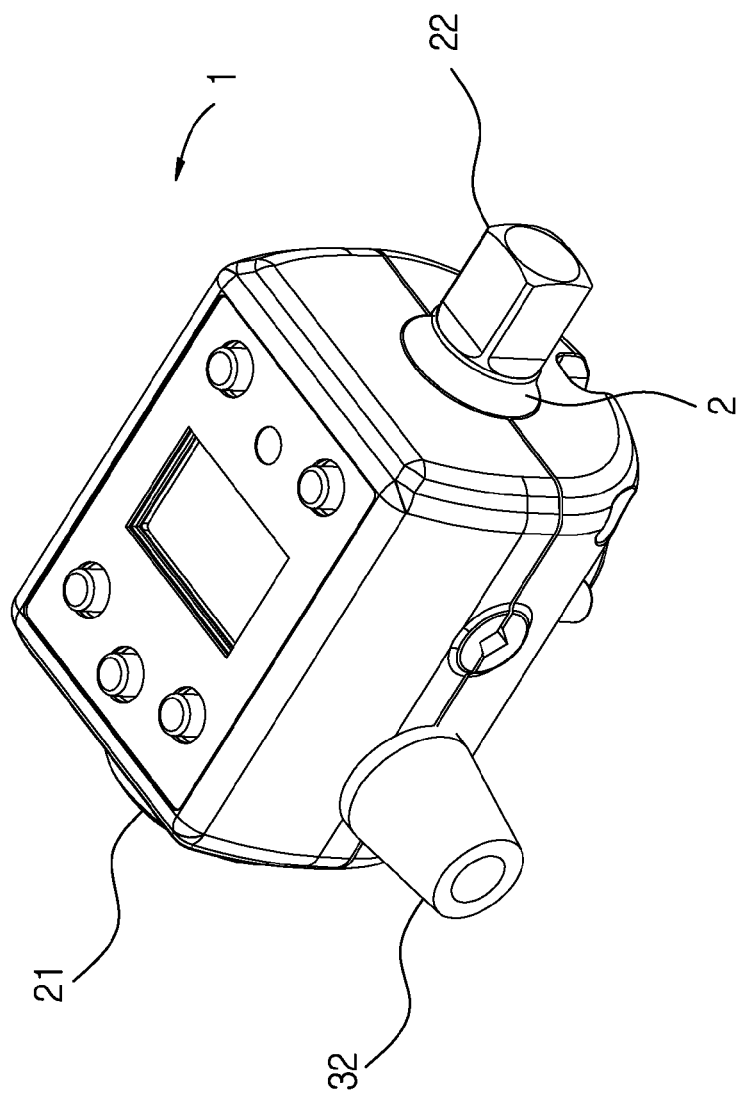
FIG. 4 is a perspective view showing the assembly of a torque tire arbor according to a second embodiment of the present invention.
Figure 5:
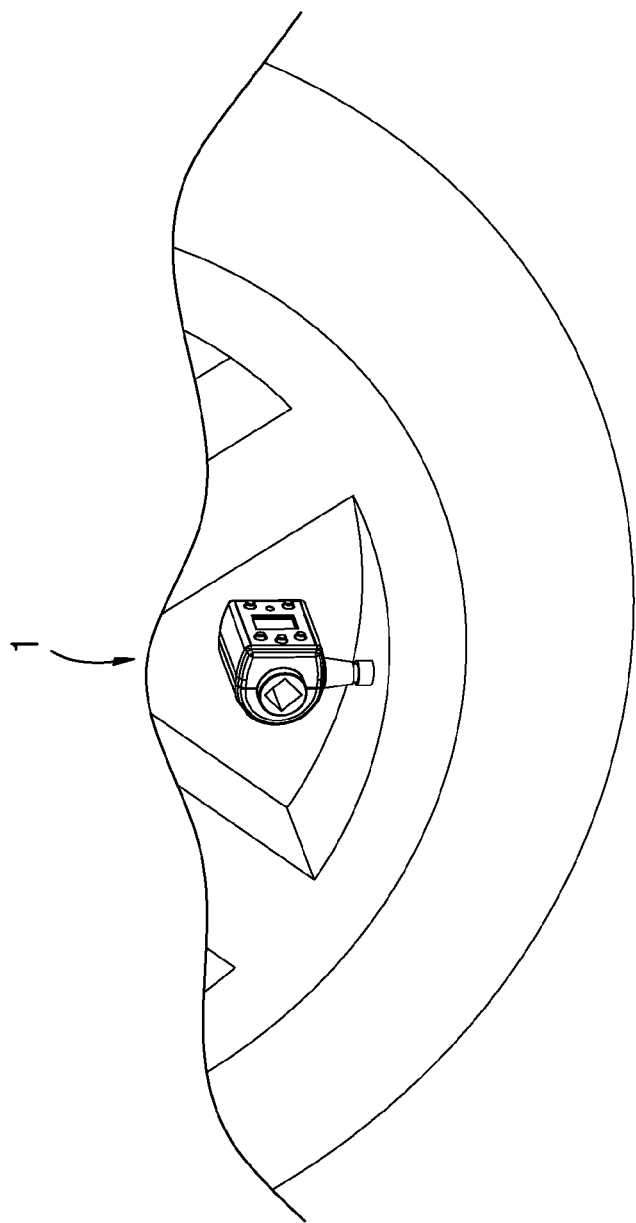
FIG. 5 is a perspective view showing the application of the torque tire arbor according to the second embodiment of the present invention.

Referring to FIGS. 4 and 5, a difference of a torque tire arbor of a second embodiment from that of the first embodiment comprises: a digital seat including a holder 32 defined on one side thereof; a pressure sensing unit 5 fixed on an inner wall of the holder 32.

Accordingly, the torque tire arbor not only can sense torque pound of locking the tire but also can measure the tire pressure value of the tire after replacing the tire.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A torque tire arbor comprising a body, and the body including a driving post and a digital seat; wherein
the digital seat covers and connects with the driving post, the driving post has a connecting segment defined on a first end thereof so as to couple with a wrench and has a working segment formed on a second end thereof so as to join with a socket; the body also includes a torque sensing unit for sensing a torque value and a pressure sensing unit for detecting a tire pressure value, the digital seat includes a display unit electrically connected with the torque sensing unit and the pressure sensing unit so as to display the torque value and the tire pressure value.

2. The torque tire arbor as claimed in claim 1, wherein the working segment has a receiving groove defined therein, and the pressure sensing unit is mounted in the receiving groove, and the receiving groove has an airtight rubber ring fitted around an inner wall thereof proximate to an opening of the receiving groove.

3. The torque tire arbor as claimed in claim 1, wherein the digital seat includes a holder defined on one side thereof, and a pressure sensing unit is fixed on an inner wall of the holder.

4. The torque tire arbor as claimed in claim 1, wherein the torque sensing unit is a torque strain gauge attached on an outer surface of the driving post.

\* \* \* \* \*